(12) United States Patent
Melchert et al.

(10) Patent No.: US 6,372,078 B1
(45) Date of Patent: Apr. 16, 2002

(54) METHOD FOR BONDING POLYESTER TO PLASTIC AND RESULTANT PRODUCT

(76) Inventors: Ronnie L. Melchert, 620 Hoague Rd.; Patrick W. Brady, 355 - 2nd St., both of Manistee, MI (US) 49660

( * ) Notice: Subject to any disclaimer, the term of this patent is extended or adjusted under 35 U.S.C. 154(b) by 0 days.

(21) Appl. No.: 09/392,684

(22) Filed: Sep. 9, 1999

(51) Int. Cl.⁷ .............................................. B32B 31/00
(52) U.S. Cl. ...................... 156/298; 156/280; 156/296; 156/290; 156/276
(58) Field of Search .................. 478/141, 142, 478/327; 156/276, 297, 280, 298, 290, 296; 264/274

(56) References Cited

U.S. PATENT DOCUMENTS

| | | | |
|---|---|---|---|
| 3,391,823 A | * 7/1968 | Tijms | 220/83 |
| 3,700,514 A | * 10/1972 | Zito, Jr. | 156/280 |
| 4,560,607 A | * 12/1985 | Sumner | 428/141 |
| 5,140,728 A | 8/1992 | Chandler et al. | |
| 5,201,980 A | 4/1993 | Chandler et al. | |
| 5,553,734 A | 9/1996 | Sharp | |
| 5,816,426 A | 10/1998 | Sharp | |

* cited by examiner

*Primary Examiner*—Merrick Dixon
(74) *Attorney, Agent, or Firm*—Warner Norcross & Judd LLP

(57) ABSTRACT

A method and resultant product for bonding a polyester resin to plastic. Preparation of a polyester resin bonded to plastic includes the steps of: (1) grinding the surface of a plastic body to create a plurality of fine plastic hairs protruding from the surface; (2) depositing liquid polyester reinforced with glass over the protruding plastic hairs, whereby the plastic hairs are substantially encapsulated and surrounded by the liquid polyester; and, (3) allowing the polyester resin to cure. Consequently, at the interface of the polyester resin and the plastic, a mechanical cohesive bond is created via the substantial encapsulation of the plastic hairs by the polyester resin.

11 Claims, 2 Drawing Sheets

METHOD FOR BONDING POLYESTER TO PLASTIC AND RESULTANT PRODUCT

BACKGROUND OF THE INVENTION

The present invention relates to a method of bonding polyester to plastic and more particularly, to a method of bonding a fiberglass reinforced polyester resin to polyethylene.

Polyethylene is well known to be a synthetic thermoplastic material having excellent properties of chemical inertness and water resistance. However, polyethylene has a very low modulus of elasticity (Young's modulus), or low rigidity, and ability to act as a support structure.

The chemical inertness of polyethylene, attributable to its highly non-polar properties, makes layers of this material well suited for lining containers, including bulk holding tanks, and other articles to be employed in contact with substances that chemically attack plastics or metals.

However, the low modulus of elasticity of polyethylene severely limits the rigidity, and consequently the size, economy, or serviceability of liquid storage tanks and other articles made of this material. For example, as the size of tanks is increased, it is necessary to either make the tanks with very thick walls of polyethylene, or to support walls of the tanks in rigid frames which themselves are not sufficiently resistant to chemical corrosion. In other applications, polyethylene components mounted to the internal walls of the tanks, typically cannot be fully self-supported unless they are very thick. In all of these applications, the cost involved causes polyethylene structures to be commercially undesirable.

Separately, it is well known that polyester resins possess a relatively high modulus of elasticity, or rigidity but have a lower resistance to chemicals than the resistance offered by polyethylene. Typical examples of polyester resins are copolymers of dicarboxylic acid esters of polyvalent alcohols, vinyl esters and vinyl monomers. They are often compounded with reinforced materials, especially glass fiber, typically referred to as fiberglass; however, even with these enforcing materials, the resins have a lower resistance to chemicals than polyethylene. Other materials may be incorporated into the polyester resins as will be appreciated by the art, including but not limited to, fibers such as cotton or shredded fabrics, mineral fibers, such as asbestos, and finely divided fillers or pigments.

Unfortunately, polyester resins, including reinforced resins such as fiberglass, have a relatively high polarity, and therefore coatings or layers of this material are not directly adhereable to layers of polyethylene by conventional coating or molding techniques without resorting to costly treatment of the polyethylene layer, such, for example, as a flamed treatment to oxidize its outer surface. Another conventional method of combining the two materials in a single structure as required the deposition of a layer of acrylic material, such as an acrylic resin on the surface of the plastic layer. A layer of fiberglass is then deposited on the acrylic layer on opposite side from the plastic layer. A large drawback to using these methods is that they involve complicated and costly manufacturing procedures to effectively bond polyester resin to polyethylene.

SUMMARY OF THE INVENTION

The aforementioned problems are overcome in the present invention using a method that provides a strong interfacial mechanical bond between plastic and polyester layers, notwithstanding the widely different chemical and physical properties of the two materials.

In the method of the present invention, a surface of a layer or body of plastic, for example, polyethylene, is physically ground such that a plurality of tiny plastic hairs protrude from the surface of the plastic layer or body. Next, a coating or layer of a polyester resin, such as fiberglass is applied or deposited on the ground surface of the plastic. Subsequently, the polyester resin hardens and effectively encapsulates and surrounds the plastic hairs to form a strong interfacial mechanical bond between the two layers.

As a consequence, rigidified polyethylene structures can be readily produced in the form of containers, bulk tanks, components for tanks, panels, and various other desired articles, with the body of each article including a layer of reinforced polyester resin directly mechanically bonded to the polyethylene layer. If desired, the properties of the polyester resin may be realized on both sides of a polyethylene article by simply grinding both sides of the article and depositing polyester resin layers thereon. Alternatively, the properties of the polyethylene may be realized on multiple sides of a polyester resin by facing two ground surfaces of polyethylene toward each other and depositing the polyester resin in a sandwich-like fashion therebetween. The articles including such a polyethylene/polyester resin wall structure can be produced economically in various configurations and sizes.

These and other objects, advantages and features of the invention will be more readily understood and appreciated with reference to the detailed description of the preferred embodiments and drawings.

BRIEF DESCRIPTION OF THE PREFERRED EMBODIMENT

Figure 1:
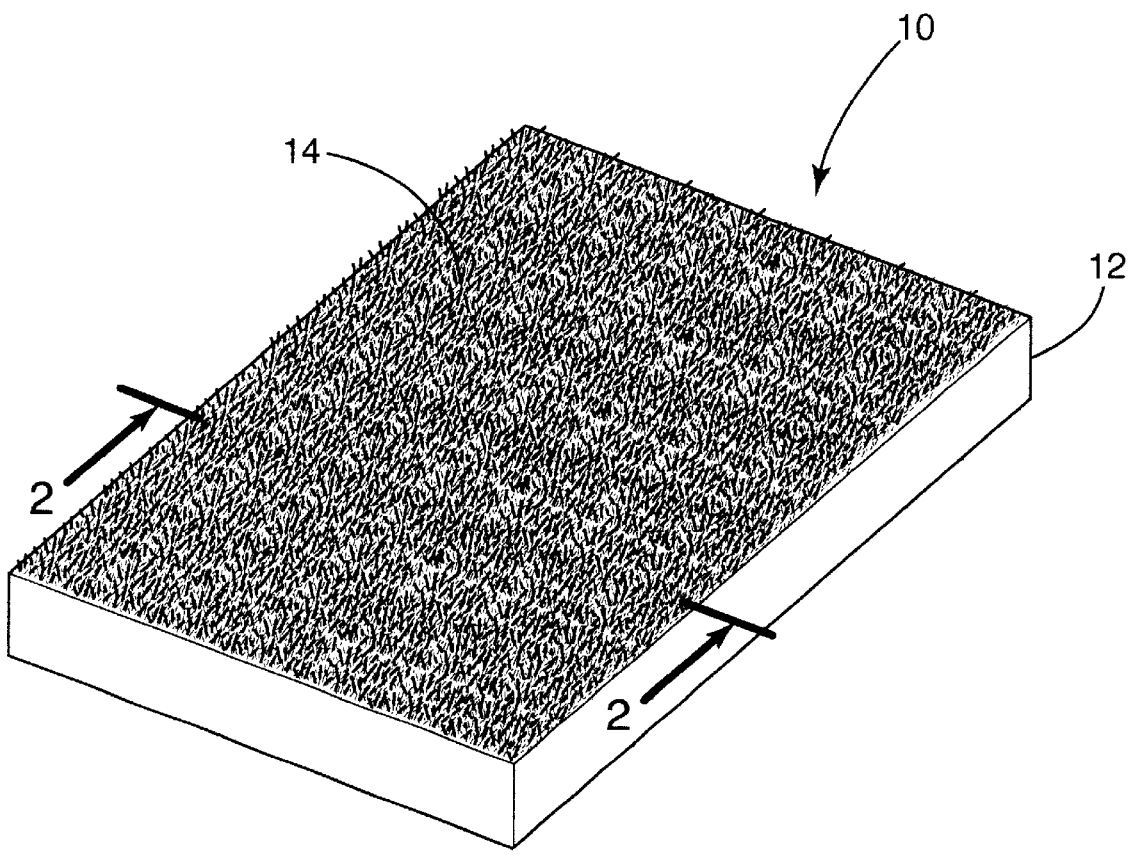
FIG. 1 is a perspective view of ground plastic prepared according to the method of the present invention.
Figure 2:
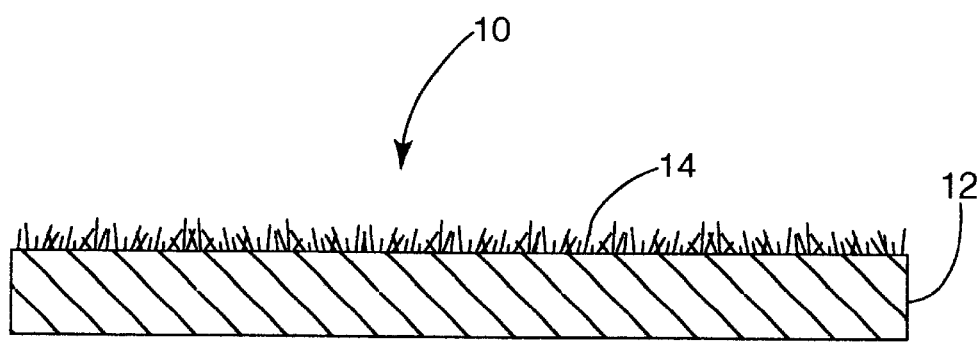
FIG. 2 is a sectional view taken along line 2—2 of FIG. 1.

A preferred embodiment of a plastic layer ground according to the method of the present invention is illustrated in FIG. 1 and 2 and generally designated 10. FIG. 1 depicts the a polyethylene layer after having been ground according to the preferred method of preparing polyethylene for deposition of a polyester resin thereon, as described below. The polyethylene layer 12 is depicted with a plurality of tiny polyethylene protrusions 14, hairs, extending from the surface layer polyethylene 12. The hairs 14 typically number from hundreds to thousands per square inch. As depicted, the polyethylene layer is in a square panel form, however, the polyethylene may be in any structure or shape. Additionally, the polyethylene layer may be of any desired thickness dictated by an intended use. The polyethylene used may be of any type as will be appreciated in the art, including, but not limited to high density polyethylene, intermediate density polyethylene, or low density polyethylene. The hairs 14 may be anywhere from 1/64 to about 1/4 inch long, that is, they protrude from the solid surface of polyethylene layer 12 approximately 1/64 to about 1/4 inches. Most preferably, the hairs are from about 1/16 to about 1/8 inch long.

Figure 3:
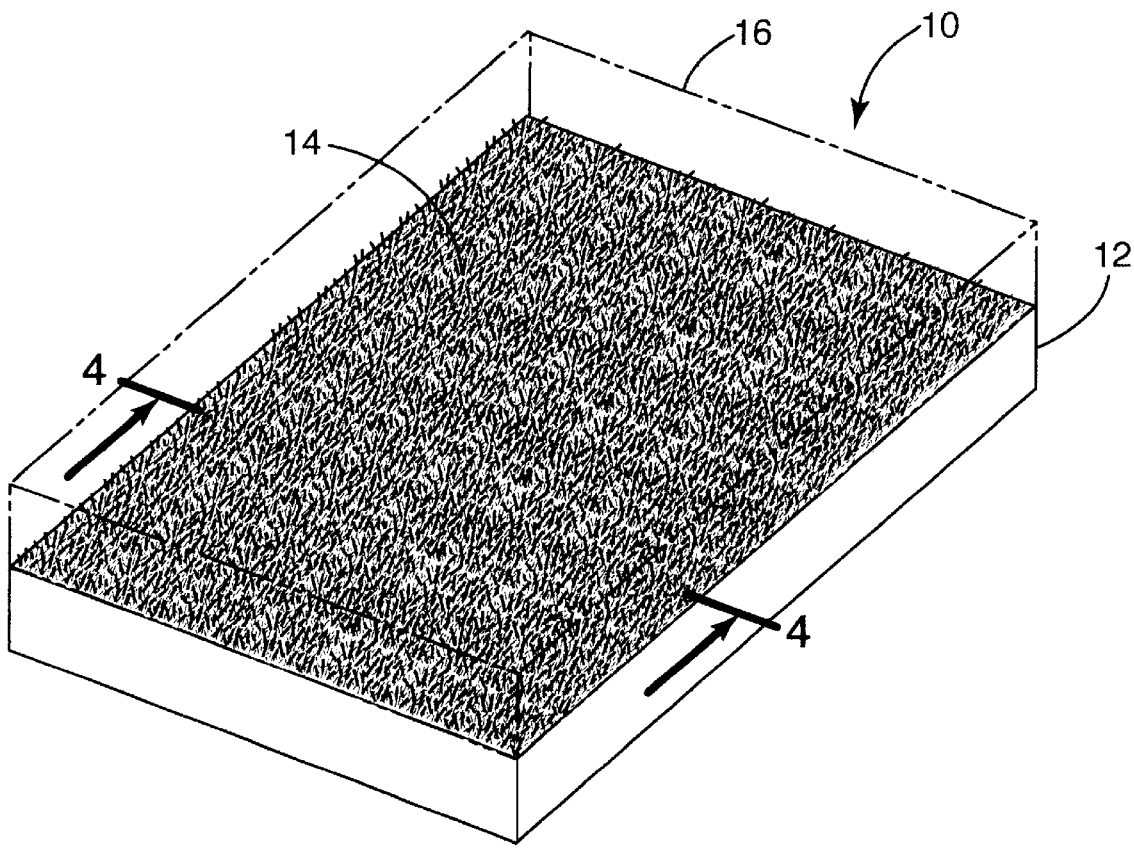
FIG. 3 is a perspective view of ground plastic with a layer of polyester resin deposited thereon prepared according to the method of the present invention.
Figure 4:
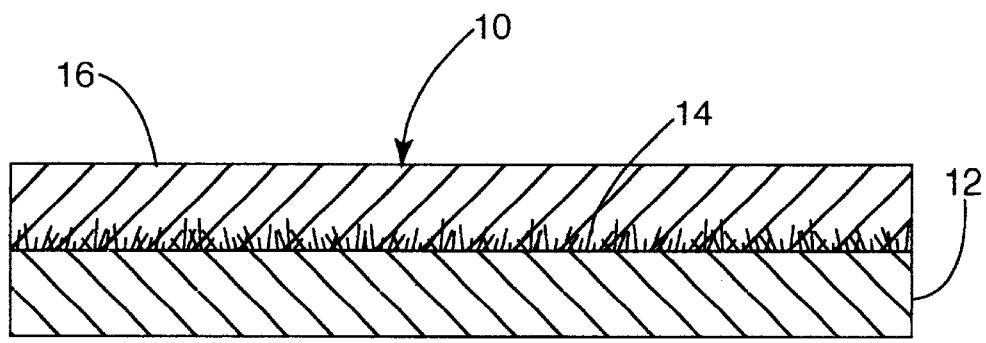
FIG. 4 is a sectional view taken along line 4—4 of FIG. 3.

FIG. 2 illustrates a polyethylene layer with a polyester resin 16 deposited thereon. The polyester resin 16 is preferably reinforced with glass fibers, however, any other reinforcing material, such as cotton or shredded fabrics, mineral fibers, such as asbestos, or finely divided fillers or pigments may be used to reinforce the polyester resin. The polyester resin composition used may be any of those which are available or known in the art relating to self-hardening polyester coating compositions. Various other additions, including other reinforcing materials, hardeners, polymerization accelerators or catalysts, and filers or pigments of various kinds, may also be employed in the liquid polyester composition, as will be readily understood by persons skilled in the art. To form the dual layer composition as depicted in FIGS. 3 and 4, the polyester resin is poured or sprayed onto the polyethylene layer 12. When the polyester resin 16 is poured or sprayed onto the polyethylene layer, it necessarily covers and encapsulates substantially each and every tiny polyethylene hair 14 protruding from the surface of the polyethylene layer 12. When the polyethylene resin hardens, it mechanically bonds to the overlapping and protruding polyethylene hairs. As a result, the polyester resin 16 is mechanically bonded to the polyethylene layer 12 at the interface of the two materials by the encapsulation of the polyethylene hairs 14 by the hardened polyester resin 16.

The thickness of the polyethylene layer 12 of the preferred embodiment which is specifically employed in the construction of components of storage tanks is approximately ¼ inch. The coating layer of polyester resin 16 is preferably 3/16 inch to provide adequate structural support for components of large tanks buried underground. However, depending on the application, the thickness of the polyester resin 16 and the polyethylene layer may be varied to provide differing degrees of structural support and lining thickness.

Method of Preparation

A preferred method of preparing a polyethylene layer reinforced with a glass reinforced polyester resin generally includes preparing the polyethylene layer to create a plurality of tiny polyethylene hairs protruding from a surface of the polyethylene layer. The polyethylene hairs remain attached at their base to the polyethylene layer and, therefore, are contiguous with the polyethylene layer. Accordingly, the hairs are not separate from the polyethylene layer and need not later be embedded into the polyethylene layer.

To create the tiny plastic hairs which allow a mechanical bond to be formed between the polyethylene and the polyester resin layers, the polyethylene layer 12 must first be ground. A polyethylene body, such as a flat panel of polyethylene is supplied. Next, a surface, or surfaces, of the polyethylene layer are ground using a 24 grit or coarser sanding material—it has been discovered that sanding materials only of this coarseness will create the tiny polyethylene hairs essential to creating the mechanical bond between the polyethylene layer and the polyester resin layer. Once the entire surface to be bonded with polyester resin has been ground to create the plurality of tiny polyethylene hairs, the polyethylene layer is ready for application of a polyester liquid compounded with glass fibers.

The polyester liquid is sprayed onto the surface, or surfaces, of the polyethylene layer 12 having polyethylene hairs 14 protruding therefrom. Alternatively, the liquid polyester may be poured on, rolled on by hand, or any other method to facilitate application onto the polyethylene layer. The polyester resin fully submerges and encapsulates substantially each polyethylene hair. Once the desired thickness of polyester resin has been deposited on the polyethylene layer and corresponding polyethylene hairs 14, the polyester resin is allowed to cure.

As the polyester resin cures, it encapsulates and hardens around substantially each polyethylene hair. At the interface of the polyester resin and the polyethylene layer, a cohesive mechanical bond is consequently formed. After the polyester resin has fully cured, the resultant polyester resin reinforced polyethylene material may be cut as desired to provide a material having chemical resistant properties as well as rigidity required for providing structural support.

Depending on the application, the polyester resin 16 may alternatively be deposited on both sides of the polyethylene layer 12; however, to accomplish this, both sides, that is the top and bottom of the polyethylene layer, must be ground to create the plurality of extending polyethylene fingers (not shown) on which the polyester resin may be deposited. In yet another advantageous embodiment, two ground polyethylene layers identical to that in FIGS. 1 and 2 are configured such that the polyethylene hairs 14 of both individual polyethylene layers 12 face directly toward each other. Subsequently, a liquid polyester resin is applied between the two polyethylene layers. The polyester resin is allowed to cure, and the resultant material is a polyester resin sandwiched between, and mechanically bonded to, two polyethylene layers. This application is particularly advantageous in forming walls or structures on the interior of tanks where the structural support layer of polyester resin may be exposed to the contents of the tank on both sides thereof.

The above description is that of a preferred embodiment of the invention. Various alterations and changes can be made without departing from the spirit and broader aspects of the invention as defined in the appended claims. Further, any reference to claim elements in the singular, for example, using the articles "a," "and," "the," or "said," is not to be construed as limiting the element to the singular. The claims are to be interpreted in accordance with the principles of patent law including the doctrine of equivalents.

The embodiments of the invention in which an exclusive property or privilege is claimed are defined as follows:

1. A method for applying a polyester resin to a plastic comprising the steps of:

grinding a surface of a plastic body until a plurality of minute plastic fibers protrude from the surface;

applying a polyester resin over said surface; and curing said polyester resin whereby said polyester resin encapsulates and surrounds the plastic fibers to create a mechanical bond between the surface of the plastic body and the hardened polyester resin.

2. The method of claim 1 wherein the plastic body is constructed at least partially of polyethylene.

3. The method of claim 2 wherein the polyester resin is reinforced with a material selected from the group consisting of glass, fibrous material, stranded material, and filamentous material.

4. The method of claim 3 wherein said grinding step is carried out using a 24 grit or coarser sanding material.

5. The method of claim 4 wherein the plastic body is the surface of a structure associated with a storage tank.

6. The method of claim 5 further comprising the step of cutting the fiberglass resin/plastic layer combination to desired shape.

7. A method of applying a polyester resin to a polyethylene body comprising:

providing a polyethylene body having a surface;

sanding the surface so that a plurality of polyethylene hairs protrude from and are integral with the surface;

applying a polyester resin over the surface whereby the polyester resin encapsulates substantially all of the polyethylene hairs; and allowing the polyester resin to harden, whereby the polyester resin mechanically bonds to the surface of the polyethylene body due to the encapsulation of the polyethylene hairs by the hardened polyester resin.

8. The method of claim 7 wherein the polyethylene hairs formed are from about 1/64 inch to about 1/4 inch in length.

9. The method of claim 8 wherein the polyester resin bonds to a substantial portion of substantially all of the polyethylene hairs.

10. The method of claim 9 wherein said sanding is carried out using a 24 grit or coarser sander.

11. The method of claim 7 wherein the polyethylene hairs formed are from about 1/16 inch to about 1/8 inch long.

* * * * *